United States Patent [19]

Caswell et al.

[11] Patent Number: 4,636,950
[45] Date of Patent: Jan. 13, 1987

[54] INVENTORY MANAGEMENT SYSTEM USING TRANSPONDERS ASSOCIATED WITH SPECIFIC PRODUCTS

[76] Inventors: Robert L. Caswell, 207 Laurelwood Ave., Placentia, Calif. 92670; C. David Bass, 17806 Joshua Cir., Fountain Valley, Calif. 92708

[21] Appl. No.: 770,070

[22] Filed: Aug. 28, 1985

Related U.S. Application Data

[63] Continuation of Ser. No. 429,546, Sep. 30, 1982, abandoned.

[51] Int. Cl.$^4$ .......................... G06F 15/24; G06F 3/04
[52] U.S. Cl. ..................................... 364/403; 364/900; 340/505; 340/825.49; 340/825.54; 235/385
[58] Field of Search ................................ 364/400–401, 364/403, 406, 464, 478–479, 200 MS File, 900 MS File; 340/505, 568, 825.06, 825.35, 825.36, 825.49, 825.54; 455/39, 66, 73; 377/13, 15; 235/385

[56] References Cited

U.S. PATENT DOCUMENTS

| | | | |
|---|---|---|---|
| 3,739,329 | 6/1973 | Lester | 340/825.49 X |
| 3,973,200 | 8/1976 | Akerberg | 340/825.49 X |
| 4,079,414 | 3/1978 | Sullivan | 340/825.54 X |
| 4,129,855 | 12/1978 | Rodrian | 340/825.54 X |
| 4,251,865 | 2/1981 | Moore et al. | 364/200 |
| 4,287,567 | 9/1981 | Lumsden | 364/900 |
| 4,366,481 | 12/1982 | Main et al. | 340/825.54 |
| 4,388,690 | 6/1983 | Lumsden | 364/900 |
| 4,398,651 | 8/1983 | Kumpfer | 340/825.35 X |
| 4,419,734 | 12/1983 | Wolfson et al. | 364/403 X |
| 4,525,146 | 6/1985 | Lennington | 340/825.54 X |

*Primary Examiner*—Gary V. Harkcom
*Attorney, Agent, or Firm*—G. Donald Weber, Jr.

[57] ABSTRACT

An inventory management system establishes remote, non-contact counting techniques whereby large numbers of units in inventory can be tracked and tabulated quickly. The system includes microelectronic transponders associated with inventory units. The transponders can communicate with computer controllers and automated data processing over standard telephone lines by using typical telemetry or other communication systems.

3 Claims, 3 Drawing Figures

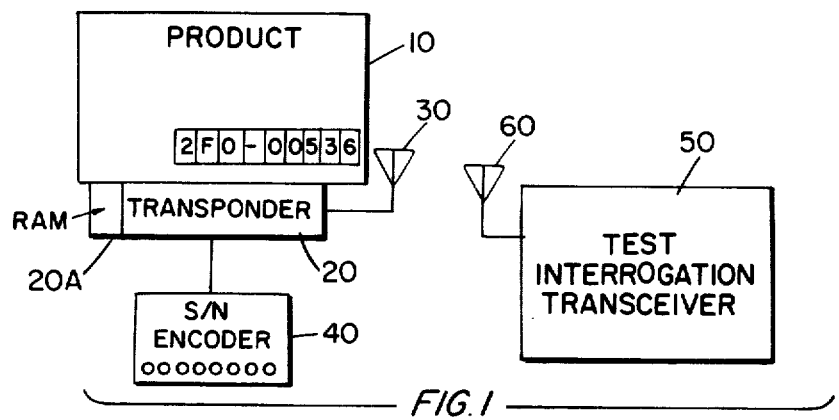
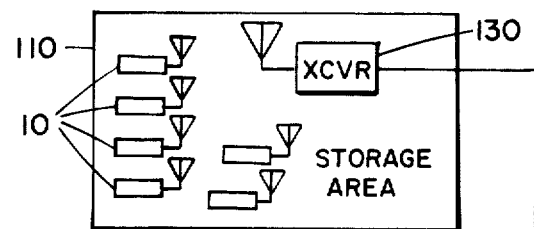
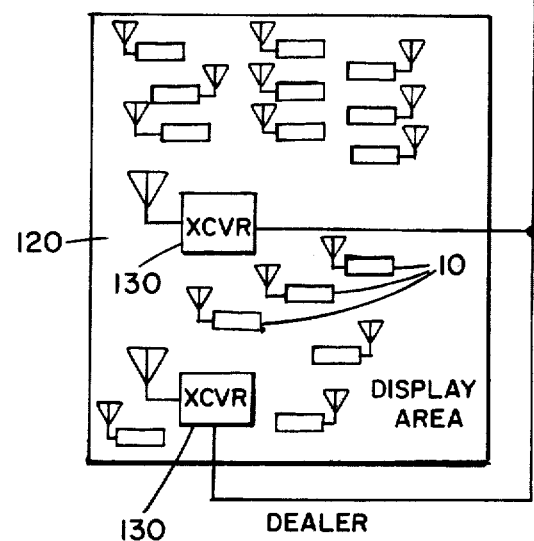
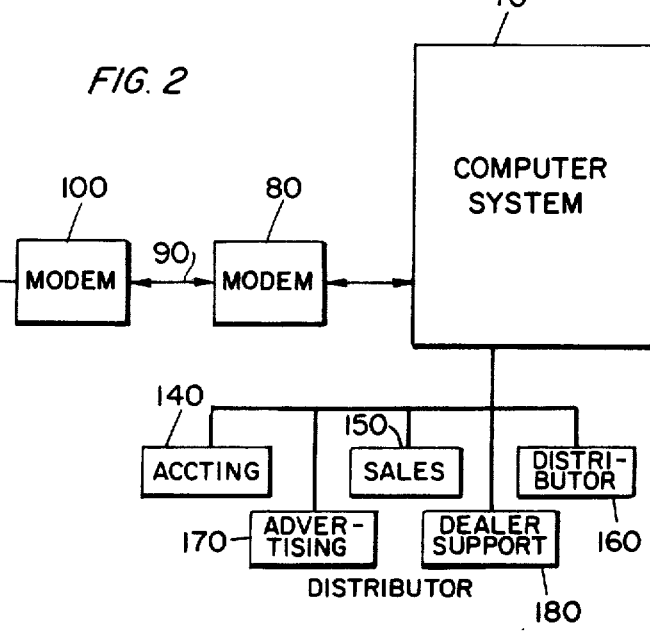
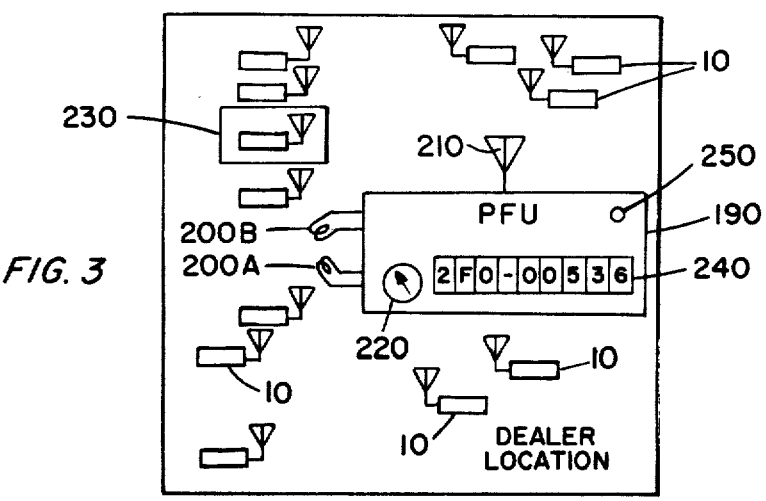

INVENTORY MANAGEMENT SYSTEM USING TRANSPONDERS ASSOCIATED WITH SPECIFIC PRODUCTS

This is a continuation of application Ser. No. 429,546, filed Sept. 30, 1982, now abandoned.

BACKGROUND OF THE INVENTION

1. Field of the Invention.

The present invention relates to a method and apparatus for inventory control, in general, and, more particularly, to such a system for the maintenance, management and control of inventory to be used by
   A. Manufacturers/distributors for the purpose of:
      (1) Optimized distribution to dealer networks through large centralized warehouses;
      (2) Close control and tracking of sold units and rapid, efficient collection therefor;
      (3) Generation of current sales data on a daily basis to optimize;
         (a) Sales and marketing campaigns;
         (b) Production, shipping and distribution planning as the system matures and the statistical data base increases; and
   B. Dealers for the purpose of:
      (4) Optimum unit sales planning;
      (5) Territorial sales statistics for more efficient ordering and internal inventory maintenance.

2. Description of the Prior Art.

Presently, the known automated, opto-electronic inventory control systems are generally based on a bar or pattern code imprinted somewhere on the item or its container. This system is used primarily with mass produced, consumable products. Each pattern code identifies a unique item and it occurs on each such item produced, frequently numbering in tens to hundreds of millions.

Point-of-sale control is implemented with laser beam scanners which generate the data to interpret the code, and interface with central computer systems. Pricing and internal inventory maintenance are at the discretion of the individual retailer who creates his own applicable software. Inventory control on shelves and displays may be maintained with portable equipment consisting of a bar pattern scanner and some type of storage device which can interface with the central computer system.

The key characteristics of this known system are:
1. Massive numbers of consumable products with a single code to identify each item together with constant, rapid inventory turnover;
2. Sale of random combinations of such items in moderate quantities (20–50 items) at frequent intervals (e.g., weekly) passing through a checkstand attended by a cashier;
3. Immediate billing by distributors with short term payment of wholesale cost by retailers;
4. Close approach to and individual examination of each item to establish direct line-of-sight between the bar pattern and the scanning device; and
5. Relatively inexpensive products.

Most other existing inventory control methods involve direct one-by-one count of individual items. The resulting data may or may not be further processed by computer. If computer processing is desired, the hand-counted information must be input into the computer by hand also. Included in this category is an array of products sold in large numbers (10-20 million annually) with an immense economic impact. Currently, this approach entails a large expense to manufacturers-distributors to control inventory and protect their investment.

The key characteristics of this type of product are:
1. Relatively expensive (hundreds of dollars and up);
2. Major purchase items (annually to several years between puchases, typically);
3. Relatively long floor time at the dealers location (weeks to months);
4. Financing of the dealers' inventory (due to large capital requirements to maintain these products), with payment terms based on time of sale to the consumer; and
5. A unique serial number which identifies each item.

Following the shipment from point of manufacture, each unit must be identified and tracked into central distribution warehouse facilities, and therefrom into the dealer network until sale and payment. The procedure of physical inspection and visual identification by serial number is a manpower-intensive technique. This process is not only expensive in and of itself, but also prone to the generation of considerable additional expense for several reasons.

For example, warehouse control is imperfect, with the result that the distributor has many units in his possession of which he is unaware. These units are not in the field, exposed for sale. Consequently, many models are not available to the public at the optimum time, and many other units remain unsold at the end of the model year. The former situation frequently results in a requirement to shift models to other warehouse locations throughout the country. Expenses are incurred for shipping, accounting, distribution and warehouse in/out charges. Unsold units in warehouses accumulate storage fees. The problem of unsold units creates a backlog of non-current models. In reasonable economic circumstances, these units must be discounted to enable dealers to move them, at the cost of lost profits. In difficult economic times, disposal of an excessive supply of non-current models is more difficult. In addition, there are serious problems in the introduction of new models to maintain competitive positions. Errors also occur in dealer pick-up at the warehouse, which create handling and accounting expenses.

Control at dealers' locations is even more difficult. Because of sheer volume of numbers, and floor check fees based on unit count, it is difficult to count more than once a month. In situations where distributors are financing the inventory, this means the dealers are floating on a substantial amount of the distributors' money, with attendant "cost-of-money expense".

More frequent floor checks are required in problem situations, e.g., non-payment for sold units. Thus, the system with infrequent checking tends to breed the problem, while the solution (more frequent checking) only adds to the expense. In any event, by the time a problem of this nature is discovered, it is usually too late to avert large losses.

The system tends to create problems because it has a number of significant error sources. Serial numbers may be misread (from the item label); misunderstood (by one member of a team writing down spoken serial numbers); and transposed or misread from the written record in a succeeding tabulation. Units still in the dealers' possession may be missed in a large store (through normal daily activity in the store during the counting process, or by simple mistake). Correction of these errors requires manpower expense from the staffs of the dealer, checker and distributor. Furthermore, all of the good data collected by the floor checkers must be processed by the distributors' accounting staff for input into his computer system. The human factor inherently includes some errors and, thus, more expense to resolve them.

Units not associated with the unsold inventory may be included in the count, for example, units in for service, units otherwise owned by the dealer, or units mistakenly paid for while unsold (missed in one check, counted in a subsequent check). The checking contractor may bill the unit count cost for such counted units. To check the checker for this type of unauthorized billing is an expense to the distributor.

Accounting data from the inventory count is related to sales data. Currently, in many industries using this type of control system, there is considerable delay in receiving and assimilating the sales statistics. There are several ways to acquire this information: direct polling of dealers, tabulation of warranty registrations, and summary report by commercial marketing statistics companies. The latter are typically 1-2 months out-of-date. Dealers are usually harried with daily operations, and not too enthused about spending time talking with distributor sales managers to gather accurate sales figures. Dealers and customers are lax about completing and submitting warranty registrations, and distributors may only update warranty reports montly. All of these information sources are time consuming, expensive and inaccurate.

Lack of timely sales data can be costly. That is, problem areas may require action such as advertising, rebates, discounts or other dealer support programs to stimulate sales. Also, industries of the type described above are highly seasonal. With data over a month old, plus ensuing time to discover the problem and plan and implement corrective action, plus another delay to receive data related to the results of the action taken, it may be a matter of "too little, too late".

Sales patterns may require shifting of various models to other locations. If this is done on the basis of month old data, there may be great expense with little return. Advertising campaigns are expensive, and if effectiveness can be determined only with month-old data, it is difficult to control and plan a national program.

Sales statistics are related to production and shipping. Currently, in some of the relevant industries, there is little effective correlation between the two, based on up-to-date data. Hence, the problems of left-over models in the wrong warehouse are, to a great extent, built into the system. The economic consequences have been discussed previously.

SUMMARY OF THE INSTANT INVENTION

The invention described herein comprises a system which utilizes microelectronic circuitry in combination with computer devices which can be connected together, for example over telephone lines, to provide a degree of automation heretofore unavailable to the entities which finance the inventory in the relevant industries. The system includes a radio frequency transponder which is integrated into the product during manufacture. Contained in solid state memory is the item serial number or other suitable unique identification code. The device also contains the logic circuitry to process data received within its radio spectrum consisting of such codes for items and the specific locations thereof. When a received code is matched by the device logic to the internally contained code, the transponder emits a verification signal to the system transceivers. The data link can be established through the commercial telephone line system. Coding and decoding of the computer signals is accomplished through MODEMS. The MODEM at the storage location can drive a plurality of transceivers, if required, to provide full coverage of diverse physical facilities.

BRIEF DESCRIPTION OF THE DRAWINGS

FIG. 1 illustrates apparatus for implementing the procedures of the subject invention including testing.

FIG. 2 illustrates an example of the subject invention applied to floor checking of units at a specified location.

FIG. 3 illustrates an example of a portable direction finding unit.

DESCRIPTION OF THE PREFERRED EMBODIMENT OF THE INVENTION

The present invention provides a means of economically and rapidly determining which units of a high-value product, e.g., a motorcycle or the like, are in inventory at a given location at any time. Further, this determination can be made from a remote location using the existing commercial telephone network as part of the communication path.

Referring now to FIG. 1, there is shown a block diagram of the basic apparatus of the instant invention as well as testing or operating apparatus. In particular, the invention incorporates a simple short-range radio transponder 20 which is included into each product preferably at the time of manufacture. This transponder is designed to respond by transmitting a pulse if, and only if, it is interrogated with a unique code, such as the serial number of the product of which it is a part. The transponder can be powered by a battery (not shown) with sufficient capacity to operate the transponder for as long as the product will be in the distribution chain. A suitable antenna 30 is associated with the transponder.

As part of the manufacturing process, after the transponder is complete and its battery power is applied and will not be interrupted, a semiconductor random-access memory (RAM) 20A, typically part of the transponder, is loaded with the serial number of the product unit on which it is installed. A temporary connection is made between the transponder 20 and the encoder 40 whereby the product serial number is read into the RAM section 20A of the transponder, which serves as its serial number memory.

The transponder 20 can be tested by interrogation transceiver 50 (having antenna 60) and which transmits, in the appropriate code, the serial number of the product having the transponder to be tested as well as a selection of serial numbers close to the correct one. The interrogator 50 monitors to assure that the transponder 20 responds to the correct signal and only to the correct signal. The transponder should function whether the product is packaged (crated or boxed) for shipment or storage, as well as if the product is set up for display or demonstration. It must be impossible to readily separate the transponder 20 from the product 10 so as to protect the integrity of the system. Both of these conditions (i.e. functional with the product either packaged or set up, and not readily separable from the product) can be met by physically integrating the transponder 20 with the product 10.

A representative application of the preferred embodiment is shown in FIG. 2, which illustrates an electronic floor check system in which a product distributor performs floor checks on the inventories of associated dealers.

The distributor's computer system 70, through the modem 80, a dialed-up telephone connection 90 to the dealer at which the current floor check is to be performed, and a second modem 100, communicates with the interrogator transceivers 130. For this application, the interrogator transceivers can be connected in parallel and need not be addressed individually, so that all of the transceivers respond simultaneously to an "interrogate" command. Thus, a "response received" indication will be returned to the distributor's computer system (via the modems and the telephone connection) if, and only if, one or more of the interrogator transceivers 130 receives a transponder response for the serial number just interrogated.

In operation, the computer system 70, through the modems 80 and 100, and the telephone connection 90, commands the interrogator transceivers 130 to interrogate the transponder-equipped products 10 in the dealer's inventory using, sequentially, each of the serial numbers of the products which have been shipped to that dealer and which are not known to the computer system 70 to have left the dealer's inventory. The interrogator-transceivers 130 then interrogate the transponders associated with the products 10 in the dealer's storage area 110 and in the showroom area 120. In this example, the showroom area 120 is sufficiently large that two interrogator-transceivers 130 are needed to adequately communicate with all of the products 10 stored and displayed there. However, the storage area 110 can be satisfactorily served by a single interrogator-transceiver. Of course, other combinations of transceivers and/or locations are contemplated, as well.

The product transponder response to each interrogation is relayed by the interrogator-transceivers back through the modems and the telephone connection to the distributor's computer system, thus updating that system on the status of the dealer's inventory.

For purposes of security and system test, the list of serial numbers interrogated should include some which are known (to the computer system) not to exist in the dealer's inventory. A response to any of these would indicate interference or malfunction. Interrogations should also be repeated, at least in cases where unusual responses are encountered, to observe consistency and permit overcoming a limited amount of noise interference. For further security against intentional interference, part or all of the system communications may be encrypted.

The distributor's computer system, by floor checking each associated dealer, in turn, through use of dialed-up telephone connections to each of the dealers, can, thus, obtain an accurate and timely analysis of product sales, with complete details of models and specific units sold (or otherwise removed from the interrogation area) since the last floor check. Since floor checks can be performed in a time period of the order of seconds per dealer, they are sufficiently rapid and inexpensive to permit checks to be conducted daily (or even more often) for all dealers. One convenient schedule is to floor check the dealers each night. The distributor's computer system 70 would then have the previous day's sales before the opening of the next business day, and this information can be available to the distributor's using organizations as of the opening of business.

In this example, the using organizations are accounting 140 to bill the dealers for floored units sold; sales 150 to track dealer sales-performance; distribution 160 to control ordering from the manufacturer and to optimize regional positioning of merchandise assets; advertising 170 to provide feedback on advertising campaign effectiveness early enough to permit redirection, cancellation, or extension, as warranted; and dealer support 180 to allow anticipation of dealer requirements. It is also both possible and desirable for the computer system to organize or act on the sales data thus obtained.

FIG. 3 illustrates another capability which can optionally be provided in the preferred embodiment. A portable direction finding interrogator-transceiver unit 190 for use in physically locating a specific transponder-equipped product unit 230 among the many other product units and other items with which it may be stored. For purposes of this explanation, product unit 230 is assumed to have serial number 2FO-00536. In operation, the thumbwheel switches 240 of the portable unit 190 are set to the serial number of the desired product unit. A momentary contact switch 250 of suitable type on the portable unit 190 is actuated. In response to the actuation of the momentary contact switch, the portable unit transmits a transponder interrogation sequence for the serial number to which the thumbwheel switches are set and awaits the response from the transponder of the desired product unit.

When the transponder response arrives at the portable unit 190, it is received simultaneously at the two loop antennas 200A and 200B and the vertical antenna 210. The two loop antennas are oriented with the null directions thereof mutually perpendicular ("crossed loops") and in a plane parallel to the plane of the fact of the direction indicator 220. The vertical antenna 210 is positioned so that its axis is normal to the plane containing the null directions of the two loop antennas 200A and 200B, and is located near that plane. The ratio of the received signal amplitudes from the two loop antennas provides direction of arrival with a ±180 degree ambiguity. However, consideration of the phase of the signal received by the vertical antenna (relative to that of the signals from the loops) permits resolution of that ambiguity and, thus, determination of the direction from which the transponder response was received. The portable unit then indicates this direction to the operator using the direction indicator 220.

The direction indicator can be a liquid crystal device having the capability of displaying a plurality of arrows, each arrow pointing in a different direction, and arranged so that the angular separation between adjacent indicated directions is both acceptably small and equal. The portable unit, thus, displays to the operator the direction from which the transponder response was received by displaying on the direction indicator 220 the arrow best approximating that direction. The arrow display can be maintained for a short time (typically one to two minutes) and then the portable unit can automatically turn off to conserve battery energy.

In operation, a person who wishes to find a given product unit using the portable unit enters the serial number of the desired product unit into the thumbwheel switches 240 on the portable unit 190, goes into the area where the desired product unit 230 is believed to be, holds the portable unit with the direction indicator 220 nominally horizontal, and actuates the momentary contact switch 250. The direction indicator then indicates the approximate direction from which the transponder response was received, and the operator walks in that direction, repeating the actuation of the momentary contact switch 250 and receiving updated direction indications as needed. After the operator has been led to the correct place, if the product units are not stacked or shelved vertically, the desired product unit should promptly be found.

If the product units are arrayed vertically, the portable unit can be turned so that the plane of the direction indicator is approximately vertical and the location of the desired product unit is near the plane containing the null direction of the two loop antennas 200A and 200B. (This will normally be near enough to the plane of the direction indicator that the operator need not make—or even be aware of—the distinction.) Upon actuation of the momentary contact switch, the direction indicator will show the operator where in the vertical array of product units the desired one is located.

The foregoing has described the present invention in terms of a system permitting a distributor flooring product units at associated dealers to perform floor checks economically, frequently, and rapidly. Those skilled in the art will readily appreciate that numerous modifications and adaptations of the technique and specifically implemented systems in accordance with the invention may readily be achieved. As examples of such modifications, a plurality of interrogating organizations, each with its own computer system and modem, could access a common network of interrogator-transceivers at dealer locations. Similarly, each organization involved in flooring merchandise or gathering data for other purposes could have its own modem and interrogator-transceiver installation at each dealer. An adaption of the system in accordance with the invention could also be employed to confirm merchandise dispatch. In this case, an interrogator-transceiver with an antenna field placed to cover the exit from the merchandise storage area could be employed to check that the properly scheduled units are leaving. This would be accomplished by interrogating the serial number of the scheduled product unit(s) as well as the serial number of product units not scheduled to depart at this time. This installation, as well as others, could serve at a dealer's location, a warehouse, a factor, a transportation depot, or a transportation vessel such as a ship, truck, trailer, cargo container, or aircraft. An interrogator-transceiver can also be placed to cover an exit through which merchandise is not supposed to be taken and interrogated repetitively with a list of serial numbers, or with an "all transponders response" code provided for in the design of the transponder. For use in cases (such as factory or warehouse exits) where it is desired to monitor a large number of units in limited interrogation time, an ambiguous code can be used. This can take the form of a special character which, when transmitted by an interrogator-transceiver as part of a serial number, will be accepted by all transponders as indicating the correct character for the character position in which it is transmitted. In use, the special character could be transmitted repetitively for most or all of the characters until a response is received, then all possible specific characters for a given position interrogated. By using (in sequential determinations if there are more than one) each specific character in that position and continuing the process to determine the other characters of the serial number, the entire unknown serial number or numbers can be rapidly determined. It is also clear that different operating frequencies can be used to separate different brands or types of merchandise or to prevent interference between installations at adjacent dealers, although the interrogation by serial number and the fact that most operations can be performed with very low transmission duty cycles limit the interference potential even without frequency diversity. In addition to or instead of direction finding to physically locate the product unit, ranging can be performed by observation of the time delay from interrogation to interrogator-transceiver reception of the transponder response. Also, there are cases where an "optimum unit to sell or ship" exists, due to such causes as variations in flooring finance rates or the need to rotate stock. An inventory control system of this type can have the capacity to identify the proper product unit and assist in locating it for sale or shipment. While the examples discussed previously presume radio communication with the transponder, it is possible to use optical or accoustic means instead. Also, the previously discussed examples employ a battery-powered transponder, but a passive transponder is possible, and may be advantageous in some applications. Moreover, any suitable or desirable coding arrangement can be used. The coding can be implemented to any level of complexity and security desired.

Furthermore, it must be understood that the primary examples given above relate to manufactured products of the "consumer-type." However, the terms "product" or "unit" must be considered to be more inclusive in nature. For example, it is contemplated that the units can take the form of documents or the like. Thus, a relatively simplified checking system can be arranged for the purpose of locating classified documents. The system can be used both for locating documents sought and/or for preventing documents from being improperly removed or destroyed. This application of the invention would be one example of a passive transponder usage.

It must be understood that the description contained herein is illustrative only. Any modifications to the system which fall within the purview of the description are intended to be included as well.

Thus, it is intended that the appended claims cover all modifications and adaptations which fall within the true spirit and scope of the invention.

Having thus described a preferred embodiment of the invention, what is claimed is:

1. In combination,
   signal producing means uniquely associated with a specific product,
   said signal producing means including storage means for storing an encoded identification of said specific product,
   said signal producing means operative to produce a signal representative of said encoded identification only in response to the application of an interrogatory signal which is related to said encoded identification of said specific product,
   signal transmitting means which is disconnected from said signal producing means and arranged to produce said interrogatory signal to activate said signal producing means,
   said signal transmitting means and said signal producing means communicate by means of radio frequency signals which are transmitted through the atmosphere,
   said signal transmitting means is selectively alterable to produce interrogatory signals of different coded variations, said signal producing means and said signal transmitting means each include respective antenna means, said signal transmitting means comprises a signal transceiver which produces said interrogatory signal to activate said signal producing means and further produces a responsive signal in response to said signal produced by said signal producing means when activated, switch means for altering said interrogatory signal code, computer means connected to selectively activate said signal transmitting means and to be responsive to said signal representative of said encoded identification produced by said signal producing means, said signal transmitting means includes a telephone link means for carrying said interrogatory signal from said computer means and for carrying said responsive signal to said computer means, directional signal detectors for selectively detecting signals from said signal producing means.

2. The combination recited in claim 1 wherein, said telephone link means includes modem devices.

3. The combination recited in claim 1 wherein, each said directional signal detector includes loop antenna means and directional indicator means.

* * * * *